Dec. 9, 1924.

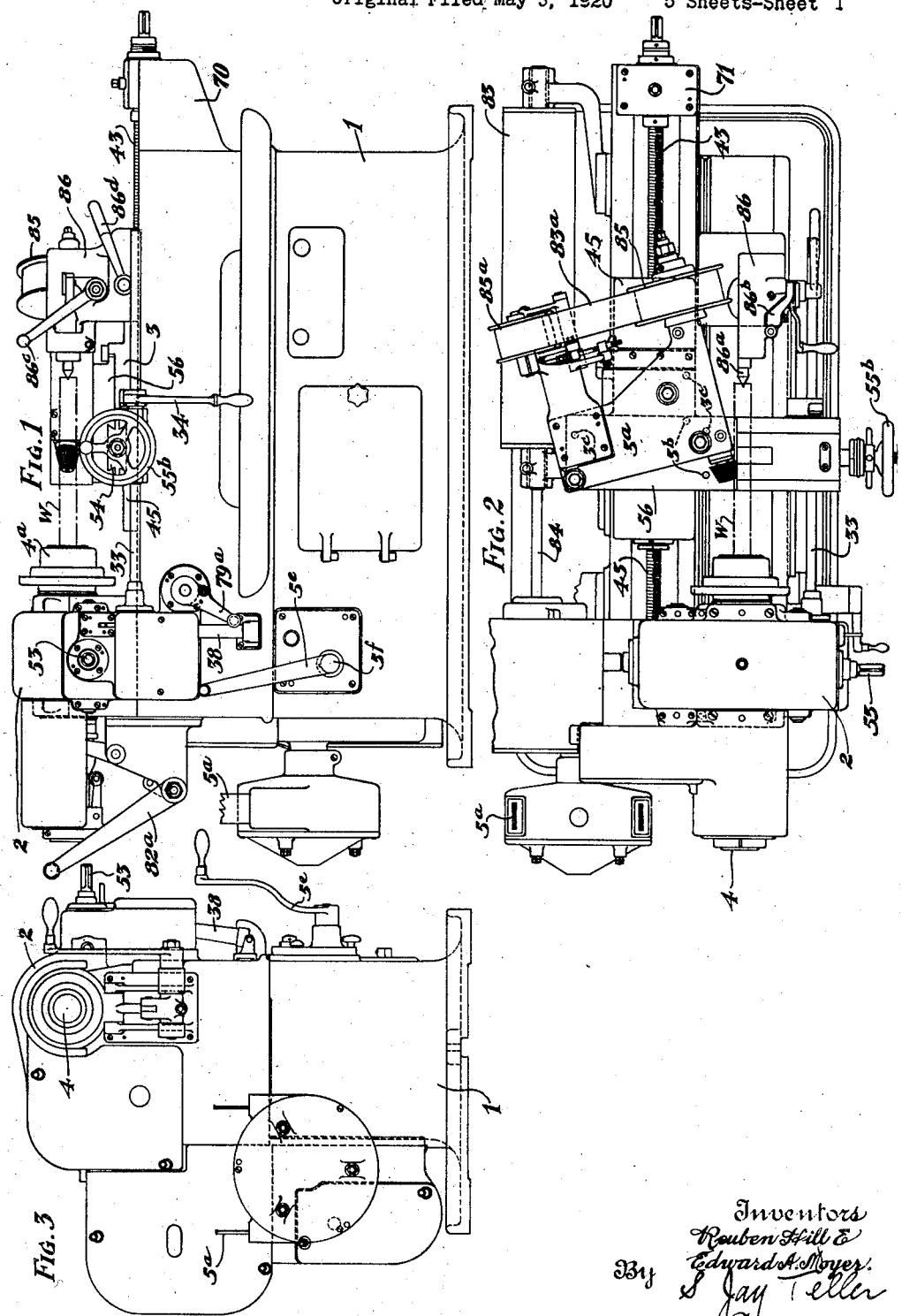

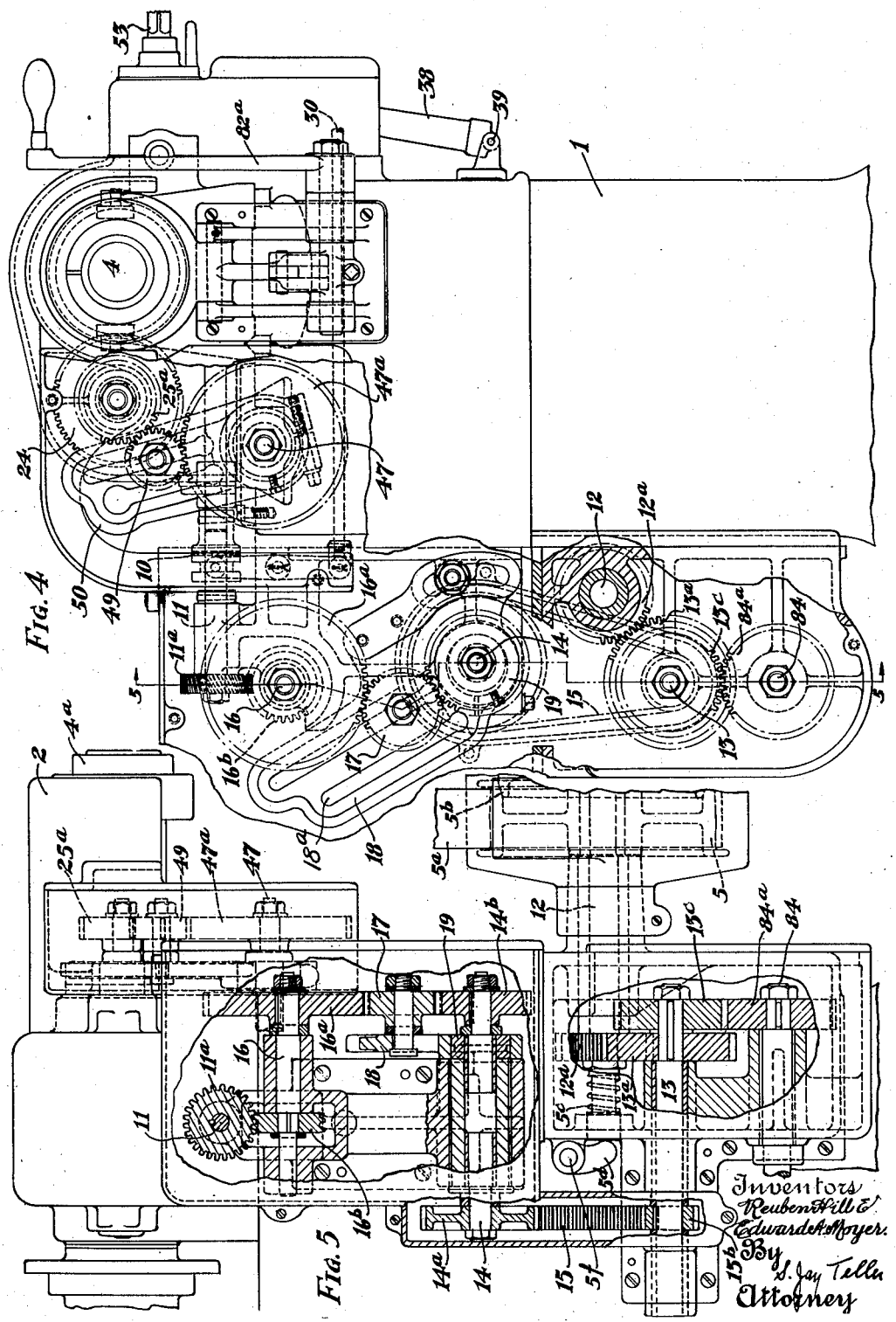

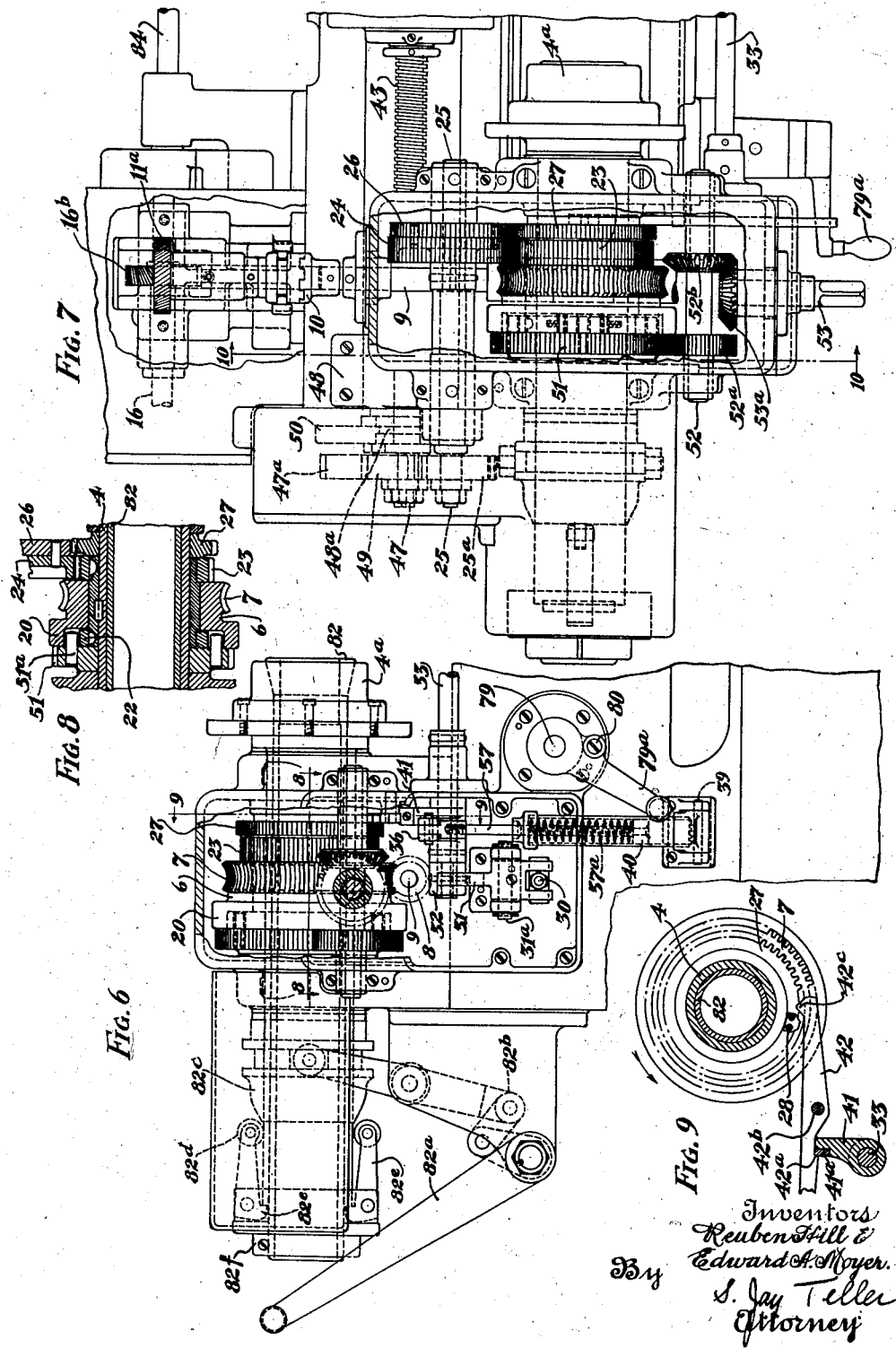

R. HILL ET AL

THREAD HOBBING MACHINE

Original Filed May 3, 1920    5 Sheets-Sheet 4

Inventors
Reuben Hill &
Edward A. Moyer.
By S. Jay Teller
Attorney

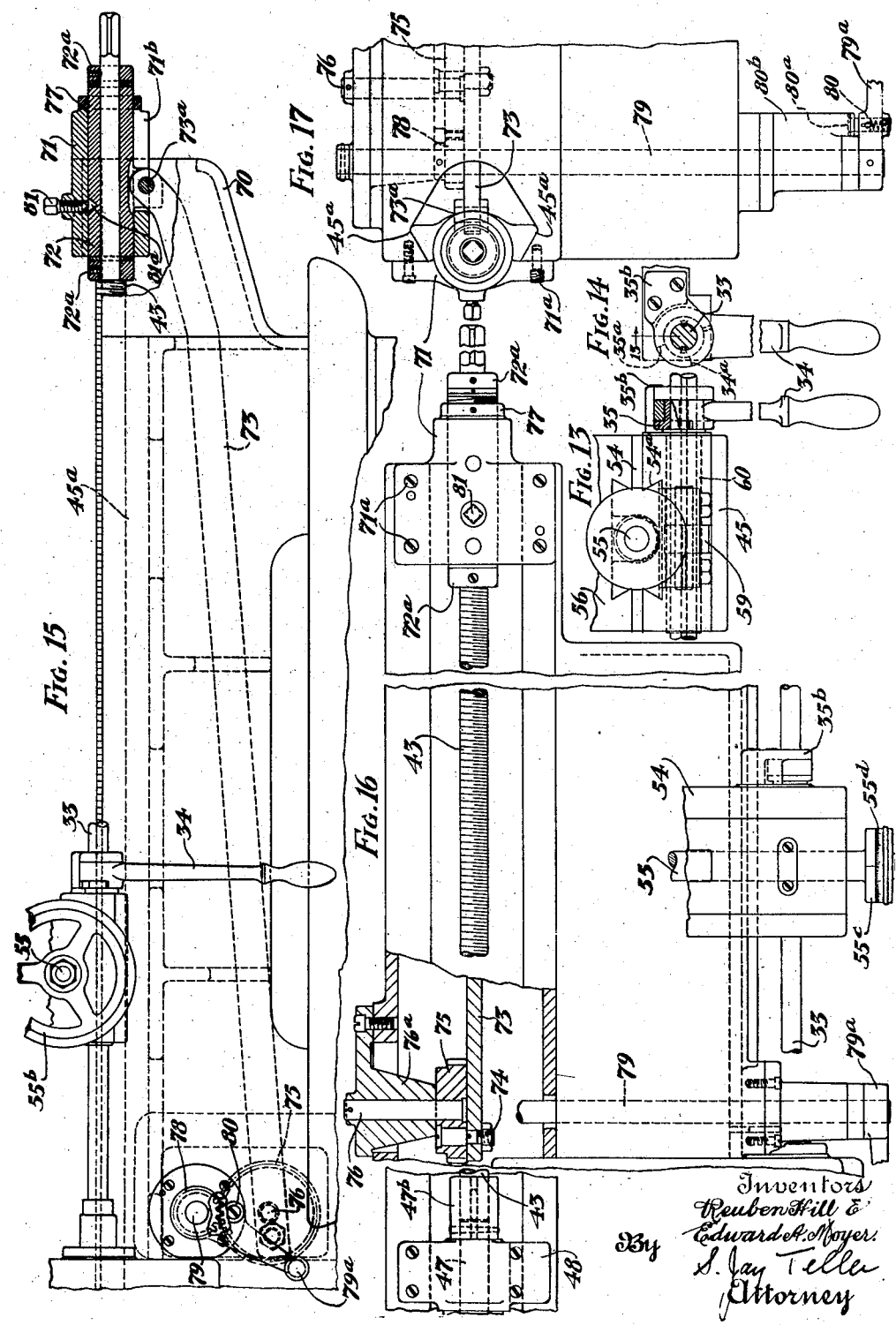

Patented Dec. 9, 1924.

1,518,201

UNITED STATES PATENT OFFICE.

REUBEN HILL, OF HARTFORD, AND EDWARD A. MOYER, OF WEST HARTFORD, CONNECTICUT, ASSIGNORS TO PRATT & WHITNEY COMPANY, OF NEW YORK, N. Y., A CORPORATION OF NEW JERSEY.

THREAD-HOBBING MACHINE.

Application filed May 3, 1920, Serial No. 378,463. Renewed May 6, 1924.

*To all whom it may concern:*

Be it known that we, REUBEN HILL and EDWARD A. MOYER, citizens of the United States, residing respectively, at Hartford, in the county of Hartford, and West Hartford, in the county of Hartford and State of Connecticut, have invented certain new and useful Improvements in Thread-Hobbing Machines, of which the following is a specification.

This invention relates to milling machines and particularly to a machine designed to mill threads by the use of cutters of the multiple type, commonly called hobs, and it is the general object of the invention to provide an improved machine of such type whereby the thread milling operation may be accurately performed in a most expeditious and efficient manner.

It is an object of the invention to provide an improved thread milling machine of the type defined including a cutter carriage and slide in combination with novel means for controlling the rotation of the work spindle whereby the same will be rotated through slightly more than one revolution and then automatically stopped.

It is an object of the invention to provide a thread milling machine of the type defined wherein the movement of the cutter slide to move the cutter into and out of engagement with the work and the rotation of the work are controlled by a common means in such manner that the cutter can be moved to its full depth into the work and out of engagement with the work only when the work is rotating.

It is a further object of the invention to provide, in a machine of the above type, controlling means whereby the rotation of the work spindle will be started before the cutter is moved to full depth into the work and whereby the cutter will be moved from engagement with the work before the rotation of the work spindle is stopped.

Another object of the invention is the provision of improved means controlled by the rotation of the work spindle for moving the cutter out of engagement with the work and for stopping the rotation of the spindle at the completion of the threading operation.

It is another object of the invention to provide mechanism for disengaging the spindle from its driving means after the completion of a cut and for rotating the spindle and moving the cutter back to initial position for starting another piece of work.

Another object of the invention is the provision of quick-acting means for moving the cutter carriage along the bed longitudinally of the work spindle to allow either external or internal work to be chucked or removed from the work holder.

Another object of the invention resides in the particular mounting of the cutter slide with its adjusting screw therein in combination with a template or taper attachment adapted to be used in milling taper threads.

With the above and other objects in view which will appear as the description proceeds the invention will now be described by reference to the drawings wherein:

Figure 1 is a side elevation illustrating a machine comprising the present invention.

Fig. 2 is a plan view thereof.

Fig. 3 is an end elevation.

Fig. 4 is an enlarged end elevation of the machine showing the housing broken away to illustrate the gearing therein.

Fig. 5 is a rear side elevation of the headstock portion of the machine, partly in section on the line 5—5 of Fig. 4.

Fig. 6 is a front elevation of the headstock portion of the machine with the housing partially broken away to illustrate the mechanism therein.

Fig. 7 is a plan view thereof, also showing the housing partly broken away.

Fig. 8 is a fragmentary horizontal longitudinal section through the spindle and its operating means taken on the line 8—8 of Fig. 6.

Fig. 9 is a cross section through the spindle on the line 9—9 of Fig. 6 showing the trip gear and its operating mechanism.

Fig. 13 is a detail front end elevation of the cutter slide and its operating mechanism, a portion thereof being in section as on the line 13 of Fig. 14.

Fig. 14 is a detail view of the controlling handle on the control shaft.

Fig. 15 is a detail side elevation of a portion of the bed illustrating certain of the cutter carriage operating mechanism.

Fig. 16 is a plan view thereof, partly in section and central portions thereof being broken out.

Fig. 17 is an end elevation thereof.

Figure 10:
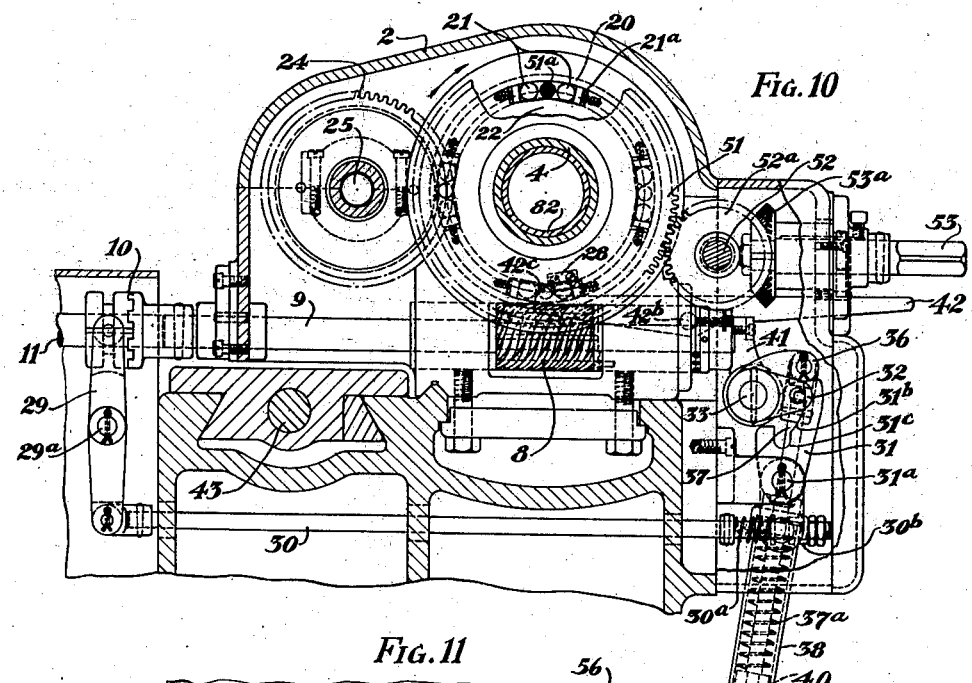
Fig. 10 is a vertical transverse section through the headstock taken on the line 10—10 of Fig. 7.

Referring more specifically to the drawings by reference characters, 1 indicates the base or bed of the machine on which is mounted the headstock mechanism 2 and the cutter carriage mechanism 3. The work spindle 4, the cutter and the cutter carriage operating mechanism are adapted to be operated by a power means as, for instance, a drive pulley 5 and belt 5ª and intermediate mechanism to be hereinafter described. In an automatic machine for cutting screw threads, a synchronous operative connection between the work and the cutter is essential, such connection taking the form of a synchronous connection between the rotation of the work spindle and a movement of the cutter longitudinally of the work spindle or a synchronous connection between the rotation of the work spindle and the rotation of the cutter, the form of connection used being dependent upon the form of the cutter. As heretofore stated, the cutter is of the hob type wherein a plurality of rows of cutting teeth extend around the hob and operate on the work to simultaneously cut a plurality of threads therein. Also, in the cutter illustrated, herein, the cutting teeth are formed in separate annular rows arranged around the hob and the hob is illustrated as being conical. It should be understood however that the invention is not limited to the particular form of cutter used or to other details which may obviously be changed within the scope of the appended claims. The particular mounting of the cutter, which mounting is adapted to receive either a conical or a cylindrical hob, forms the subject matter of a copending application, of Bryant H. Blood, Serial No. 356,476, filed February 5th, 1920. Briefly, when using a conical hob, the cutter is supported as illustrated in Fig. 2. When using a cylindrical hob on work supported solely in the chuck 4ª, the frame 3ª of the cutter is bolted in holes 3ᵇ in the cutter slide, and when working with a cylindrical hob on work supported between centers or between the chuck and tailstock center, the frame 3ª is bolted in holes 3ᶜ. This construction is fully described and illustrated in the aforesaid application.

Main driving mechanism.

The driving means for the spindle 4 preferably comprises a member 6 loosely mounted on the spindle and provided with worm wheel teeth 7 thereon. A worm 8 on a transverse shaft 9 meshes with the worm wheel to drive the same As a means to engage and disengage the drive to the member 6, we provide a clutch 10 between the shafts 9 and 11. The driving connections from the drive pulley 5 to a spiral gear 11ª on the shaft 11 comprises the following mechanism: A friction clutch 5ᵇ is normally held in driving engagement with the pulley 5 by means of a spring 5ᶜ and is adapted to be disengaged by means of an arm 5ᵈ and a hand lever 5ᵉ on a shaft 5ᶠ. A gear 12ª on the pulley shaft 12 meshes with a gear 13ª on the shaft 13. A second gear 13ᵇ on the shaft 13 drives a gear 14ª on the shaft 14 by means of a chain belt 15. A gear 14ᵇ on the shaft 14 is adapted to drive a gear 16ª on the shaft 16 through changeable gear or gears 17 on a bracket 18 mounted on a hub 19 about the shaft 14. A spiral gear 16ᵇ on the shaft 16 meshes with the spiral gear 11ª whereby the shaft 11 and the spindle driving member 6 are operated. While the gearing and connections described and illustrated herein provide a convenient and efficient driving mechanism it should be understood that the invention is not limited to such details.

As heretofore stated, the machine is adapted to operate on either external or internal work to cut threads thereon or therein respectively. As illustrated in the drawing, the machine is set up to operate on external work W. To operate on internal work, it is essential that either the cutter spindle or work spindle should be rotated in the opposite direction. The change gear bracket 18, shown in Fig. 4, provides for this change. Such bracket is provided with a slot 18ª therein adapted to receive a stud for supporting an idler gear adapted to mesh with gears 14ᵇ and 17, the drive from shaft 14 to shaft 16 in such instance being through gear 14ᵇ, the said idler gear, gear 17 and gear 16ª. It will be clear that the interposition of such additional gear will result in rotating the work spindle 4 in the opposite direction.

Spindle driving mechanism.

We preferably provide novel means for controlling the rotation of the work spindle whereby the same will be rotated through slightly more than one revolution and then automatically stopped, and the following mechanism comprises one suitable embodiment of such means. The spindle driving member 6 loosely mounted on the spindle 4 forms at one end thereof the outer element 20 of a roller clutch mechanism to be hereinafter more fully described. Clutch rollers 21 are mounted between the outer clutch element 20 and the inner element 22 which is non-rotatably secured to the spindle, the clutch rollers being normally held in driving engagement by means of spring-pressed plungers 21$^a$. A gear 23 keyed to the spindle (Fig. 8) meshes with a gear 24 keyed to a shaft 25 and also secured to a gear 26 which meshes with a trip gear 27 loosely mounted on the spindle 4. Gears 23 and 24 have the same number of teeth and therefore rotate at the same angular speed. Gear 26 has slightly less teeth than the gear 27 and, therefore, during one rotation of the gear 27, gears 23, 24 and 26 as well as the spindle 4 rotate through slightly more than one revolution. A trip dog 28 (Figs. 9 and 10) mounted on the gear 27 operates a controlling mechanism now to be described to automatically stop the spindle after one complete rotation of the gear 27.

Controlling mechanism.

An operating arm 29 (Fig. 10) pivoted at 29$^a$ engages the clutch 10 at one end and has connected to its other end an operating rod 30. A rocker 31 pivoted to a bracket at 31$^a$ is operatively connected to the rod 30 between a spring 30$^a$ and a stop collar 30$^b$ thereon. The upper part of the rocker is provided with a circular portion 31$^b$ and a socket portion 31$^c$ on which portions the outer end of a controlling arm 32 is adapted to ride. The arm is keyed to a control shaft 33 extending along the front of the machine and preferably operated by a handle or lever 34 thereon. A second arm 36 also keyed to the control shaft has pivoted thereto a plunger 37 normally drawn downward by a compression spring 37$^a$ within a casing 38 pivoted to the base at 39. The rotative movement of the control shaft is uniformly regulated by means comprising a dashpot, the lower end of the casing serving as the dashpot reservoir within which slides a piston 40 on the lower end of the plunger rod, the piston fitting loosely within the cylinder whereby fluid within the reservoir can slowly pass upon movement of the piston. A third arm 41 (Figs. 6, 9 and 10) non-rotatably mounted on the control shaft projects outwardly therefrom and a shoe 41$^a$ on such arm is adapted to be engaged by a shoulder 42$^a$ on an arm 42 pivoted at 42$^b$. The inner end of the arm 42 is provided with a V-shaped nose 42$^c$ adapted to be engaged by the trip dog 28 heretofore described, the downward movement of the nose 42$^c$ of the arm being adapted to raise the shoulder 42$^a$ and release the arm 41 whereupon the spring 37$^a$ operates the control shaft to disengage the clutch 10.

By reference to Figs. 13, 14 and 15, it will be noted that the control shaft operating lever 34 is mounted loosely on a bushing 35 splined to the control shaft and journaled in a bracket 35$^b$ secured to the cutter carriage 45. The hub of the lever is provided with a shoulder 34$^a$ adapted to engage a shoulder 35$^a$ on the bushing for rotating the latter and the control shaft to start the operation of the machine and move the cutter into engagement with the work. When the machine is in operative position the control shaft is secured from rotation by the shoulder 42$^a$ on the arm 42 and the lever is free to drop downward as shown in Figs. 13, 14 and 15.

Cutter carriage feeding mechanism.

In a screw thread milling machine of the type illustrated wherein the cutter teeth are arranged in annular rows, it is necessary to give the cutter a feeding movement longitudinally of the work the pitch distance of one thread simultaneously with the rotation of the work. We preferably perform this operation through a feed screw 43 threaded into a nut 44 (Fig. 12) on the cutter carriage 45. Preferably this nut is made in two parts as illustrated, whereby any looseness thereof of the screw may be taken up by means of the threaded adjusting collar 44$^a$, the nut being held between such collar and the shoulder 44$^b$ on the carriage. The nut is also preferably provided with worm wheel teeth 46 therein engaged by a worm 46$^a$ operable by means of a handle 46$^b$ whereby the carriage may be adjusted on the screw by hand. A thumb nut clamp 46$^c$ serves to lock the handle in place. The headstock end of the screw is splined to a driving member as a sleeve 47$^b$ pinned to the shaft 47 (Figs. 7 and 16) mounted within a bearing 48 on the base. Such shaft 47 is adapted to be rotated from the before-mentioned shaft 25 by means of gears 47$^a$ and 25$^a$ respectively on the shafts and change speed gearing 49 on a bracket 50 mounted on a hub 48$^a$ of the bearing 48.

Carriage and work spindle return clutch mechanism.

After the completion of a threading operation, the several parts of the machine must be placed in their initial position ready to perform the same operation on another piece of work. As one embodiment of means for quickly and accurately performing this function, we provide the following mechanism (Figs. 6, 7, 8 and 10). Mounted loosely on the spindle 4 is a gear 51 having a pin 51ª thereon extending between each pair of clutch rollers 21. A gear 52ª on a short shaft 52 meshes with the gear 51 and a bevel 52ᵇ also on the shaft 52 meshes with a bevel gear 53ª on a short shaft 53 having a squared end thereon extending without the housing. The gear 51 and the operating parts connected therewith normally rotate freely with the clutch mechanism. However, at the end of a threading operation, when the cutter has been drawn out of engagement with the work and the work spindle rotation is stopped, the shaft 53 is rotated to rotate the gear 51 in a direction opposite to the working operation of the spindle. Each pin 21 engages its adjacent roller and moves it to disengaging position whereby the spindle is disengaged from its driving means 6 and the continued reverse rotation of the gear 51 rotates the spindle and the gear 23 independently of the spindle driving means 6. It will thus be seen that the spindle is thereby turned backwardly to its initial position and through the rotation of the spindle, gears 23 and 24, shaft 25, gear 25ª, change speed gearing 49, gear 47ª, and screw 43, the cutter carriage 45 is fed backwardly to its initial position. In a like manner the trip gear 27 is rotated back to initial position and the raising of the arm 42 by the trip dog 28 indicates when the mechanism has reached the initial position. It should be noted that the clutch mechanism, comprising the rollers 21, is double-acting, i. e. is operative in one direction or the other by means of the gear 51 and pins 51ª.

Cutter carriage mechanism.

Figure 11:
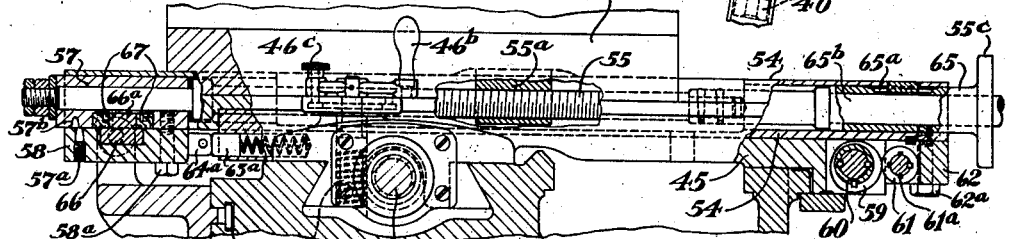
Fig. 11 is a fragmentary vertical transverse section through the machine, certain parts thereof being broken away to illustrate the cutter slide mechanism.
Figure 12:
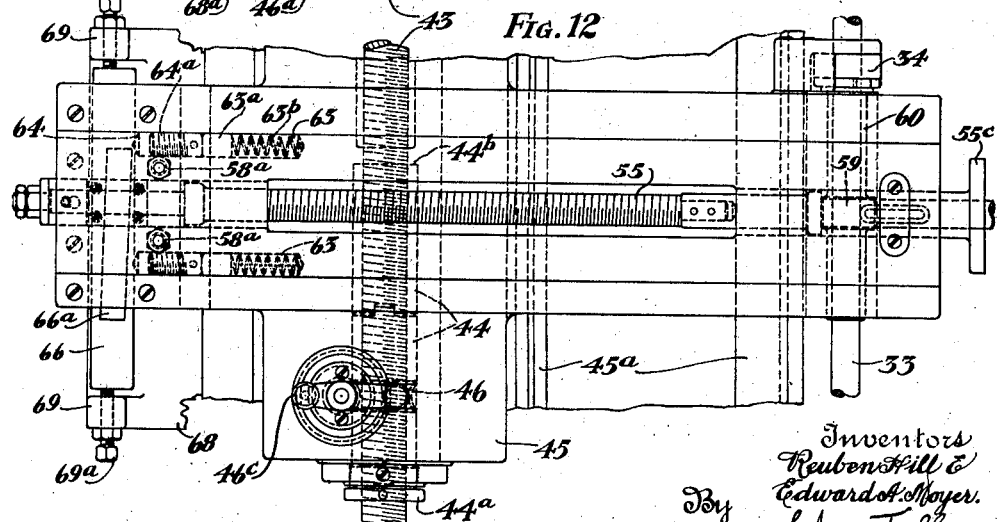
Fig. 12 is a fragmentary plan view thereof, the cutter slide being removed.

As heretofore stated, the cutter carriage 45 (Figs. 11, 12 and 13) is longitudinally slidable on the ways 45ª of the bed. A transverse cutter slide 54 is mounted to slide in ways 54ª of the cutter carriage and such slide supports therein a cutter adjusting screw 55 engaging a nut 55ª depending from a second slide 56 which is adapted to support the tool or cutter thereon. For performing certain kinds of work, particularly the cutting of taper threads, we preferably mount the screw bodily movable within the slide 54. This construction comprises a sleeve 57 journaled to the inner end of the screw, the sleeve in the ordinary screw threading operation being secured to the slide 54 by means of a pin 57ª threaded into a depending portion 58 of the slide 54 and seating in a socket 57ᵇ in the sleeve. Bolts 58ª secure the portion 58 to the slide 54. For moving the cutter into and out of engagement with the work, which movement is only enough to clear the deepest thread likely to be milled, we preferably move the entire slide 54 and the parts thereon and we employ a cam as a convenient means for performing such function. As shown in Figs. 11, 12 and 13, we mount a cam 59 on a bushing 60 splined to the control shaft 33 and journaled to the cutter carriage 45 for movement therewith. The cam is adapted to engage an abutment 61 on a block 62 depending downward from the slide 54 and secured as by bolts 62ª. This abutment 61 is preferably in the form of a bushing having a plurality of keyways 61ª therein whereby the same may be adjusted to bring unworn portions thereon into position for engagement by the cam 59. It will be noted that in operation the rotative engagement of the cam with the abutment positively moves the cutter into engagement with the work, and while the construction might be such that a reverse movement of the cam would withdraw the cutter from the work, we prefer to employ resilient means for performing such withdrawing function. As seen in Figs. 11 and 12, we provide sockets 63 in the cutter carriage 45 and mount a plunger 63ª and a spring 63ᵇ engaging such plunger in each socket. We also provide a socket 64 in the depending portion 58 of the slide 54 in alignment with each socket 63 and mount screw threaded plugs 64ª therein for engagement with the plungers 63ª. By this construction the abutment 61 is held in tight engagement with the cam 59 and the cutter is normally disengaged from the work. The resilient action of the springs may be regulated by means of the screw threaded plugs 64ª.

Rotation of the hand wheel 55ᵇ rotates the screw 55 to adjust the upper cutter slide 56, and indexed dials 55ᶜ and 55ᵈ (Fig. 16) indicates the amount of such adjustment. The dial 55ᶜ has a sleeve 65 (Fig. 11) splined at 65ª providing a limited longitudinal movement thereof in the carriage 54, and the dial 55ᵈ is secured to the screw shaft 65ᵇ. The dial 55ᵈ is preferably indexed in thousandths of an inch and a zero mark is placed on the stationary dial 55ᶜ. It should be understood that the screw is normally securely clamped against rotation except when making an adjustment.

Taper attachment.

The taper attachment (Figs. 11 and 12) preferably comprises a template or taper bar 66 having longitudinally extending inclined projecting portion 66ª thereon, the bar being seated in a recess in the portion 58 of the slide 54. The projection 66ª extends between a pair of hardened guide shoes 67 in a recess in the under side of the sleeve 57. A bracket 68 adjustable in T-slots 68ª along the bed 1 has a pair of arms 69 at the ends thereof, and mounted in each arm is an adjustable member as the screw bolts 69ª, for engaging the ends of the bar. It will therefore be seen that as the cutter carriage 45 is moved longitudinally on the bed in the cutting operation, the bar 66 is held from partaking of such longitudinal movement with the result that the sleeve 57, in riding on the inclined portion 66ª, is moved transversely of the work spindle, the screw 55 and upper cutter slide 56 being of course moved therewith. The engaging pressure of the screw bolts 69ª on the ends of the bar 66 is so slight that the bar is not prevented from partaking of the slight transverse movement of the cutter slide 54. From the construction shown in Figs. 11 and 12 and above described, it should be clear that the cutter slide 54 is movable transversely on the cutter carriage 45 under the action of cam 59 and spring 63ᵇ; that when using the taper attachment, the screw 55 and its cooperating parts, including the splined dial sleeve 65, are bodily movable with the sleeve 57 longitudinally in the cutter slide 54 under the control of the taper bar 66; and that the upper cutter slide 56 is movable transversely on the slide 54 under the rotation of the adjusting screw 55.

*Quick-acting mechanism for moving the lead screw and cutter carriage.*

In certain screw threading operations as, for example, when milling internal threads in work held in the spindle chuck, it is usually necessary to shift the carriage quickly along the bed to allow work to be chucked or removed. We have devised and herein illustrate a quick-acting mechanism for performing this function, the operation of which mechanism comprises a movement of the lead screw bodily thereby eliminating any wear on the screw and nut and providing the necessary speed and accuracy required of such a mechanism. Referring particularly to Figs. 15, 16 and 17, it will be seen that the tailstock end of the feed screw 43 is supported on a bracket extension 70 of the base. The bearing for the screw on the extension 70 comprises a member 71 mounted in an extension of the dovetailed carriage way 45ª in the bed and secured by screws 71ª. Journaled to the screw between two collars 72ª pinned thereon is a sleeve 72 which sleeve is adapted to slide longitudinally within the bearing 71. As heretofore stated, the headstock end of the screw is splined to its driving element at 47ᵇ whereby the screw is free to be moved longitudinally by any convenient mechanism, such as that now to be described. The screw is free to revolve within the sleeve 72 and we provide means, as a link 73, having one end engaging lugs on the sleeve at 73ª and having means at its opposite end for moving the link and screw longitudinally. This means preferably comprises a crank pin 74 securing the link to an operating member, as a disk or gear 75, adapted to rotate on a center as the shaft 76 mounted in a bracket bearing 76ª bolted to the base. In Figs. 15 and 16, the mechanism is shown as holding the cutter carriage in the work-operating position, the center of shaft 76 being positioned between the crank pin and the sleeve-engaging end 73ª of the link, and the centers of the crank pin 74 and shaft 76 being preferably in alignment with the line of stress exerted through the link in holding the elements in work-operating position. It will be seen that rotation of the member 75 will move the crank pin around the center 76 and move the link longitudinally to slide the sleeve 72, screw 43 and carriage 45 along the bed in a direction away from the headstock. The bearing 71 is longitudinally slotted at 71ᵇ to permit the parts 73ª to slide therein.

In screw thread milling it is very essential that the cutter be returned very accurately to its initial cutting position and held rigidly in such position during the cutting operation. As a means for maintaining this accuracy we provide a stop member 77 preferably screw threaded to the sleeve 72 whereby the same may be adjusted to take up any wear on such co-engaging elements. This member 77 moves with the sleeve and in the operative position shown in Figs. 15 and 16, it is held in tight engagement against the outer end of the bearing 71.

As a convenient means for operating the gear 75 we provide a second gear 78 preferably of half the size of gear 75 and meshing therewith. A shaft 79 on which the gear 78 is mounted extends without the housing and is provided with a handle 79ª thereon. As a means for securing the elements in the operative position, we provide a spring-pressed detent 80 preferably on the handle 79ª, such detent being adapted to engage in a depression 80ª in the bearing 80ᵇ. It will therefore be seen that by a single rotation of the handle 79ª the cutter carriage may be quickly drawn away from the headstock along the bed and a reverse rotation thereof as quickly returns and locks the cutter carriage in operative position with the cutter in the exact cutting relation to the work.

When operating on work wherein it is unnecessary to move the cutter along the bed away from the headstock, it is often desirable to permanently lock the sleeve 72 directly to the bed against longitudinal movement. For this purpose we provide a set screw 81 threaded into the bearing 71 and adapted to engage a notch 81ª in the sleeve whereby the sleeve is held securely in its initial position with the stop 77 in tight engagement with the end of the bearing 71.

In Figs. 6 and 7 of the drawing, we have illustrated the work-holding means as comprising a chuck sleeve 82 of the draw-in type conveniently operated by a hand lever 82ª and the linkage 82ᵇ, cone 82ᶜ and rollers 82ᵈ on arms 82ᵉ pivoted to the collar 82ᶠ secured to the chuck sleeve 82. Operation of the lever 82ª causes the cone 82ᶜ to force the rollers outward and the arms 82ᵉ abut against the end of the spindle whereby the sleeve 82 is moved longitudinally with the collar 82ᶠ. However, it should be understood that the particular type of workholder comprises within itself no part of the present invention and any suitable and desirable form of work holder may be used without departing from the spirit of the invention. Also, while we have illustrated the cutter and work spindle as driven from the same source of power, e. g., pulley 5, it should be understood that the cutter driving means within itself forms no part of the invention and may be considerably modified within the scope of the appended claims. The construction illustrated comprises a driving drum 83 on a shaft 84 to which is keyed a gear 84ª meshing with a gear 13ᶜ on the shaft 13 (Fig. 5). A belt 83ª passes around the drum and over idler pulleys 85ª to a belt pulley 85 on the cutter shaft by which construction the cutter is adapted to be rotated in any position along the work. Different desired speeds of the cutters may be obtained by substituting different sized gears for the gears 13ᶜ and 84ª.

Briefly, the tailstock shown in Figs. 1 and 2 comprises a body portion 86, a slidable center 86ª, a clamping arm 86ᵇ, a center moving lever 86ᶜ, and a lever 86ᵈ for clamping the tailstock to the base. The tailstock is not within itself a part of the present invention and therefore has not been illustrated and described in detail herein. It should be understood that as far as the present invention is concerned, any usual form of tailstock of the general type illustrated may be used.

In Figs. 1 and 2 we have shown the work W as being held in the chuck 4ª and supported at its outer end by the tailstock 86. It should, however, be understood that the machine is adapted to perform various screw threading operations on work supported by the chuck and tailstock, on centers or entirely within the chuck, such features of the invention forming the subject matter of the copending application above mentioned.

*Operation.*

Briefly, the general operation and control of the machine is as follows. The machine is assumed to be in the operating position as shown in all views of the drawing, with the work spindle rotating in the direction indicated by the arrow in Figs. 9 and 10, the cut nearly completed as is evidenced by the position of dog 28, the cutter in engagement with the work W as indicated by the position of cam 59 in Fig. 11, and all the operating elements, including the rotation of the cutter, being operated from the pulley 5. This operation will continue until the dog 28 comes into engagement with and forces the nose 42ᶜ of the arm 42 downward and the shoulder 42ª upward out of engagement with the arm 41 on the control shaft 33. When thus released the control shaft will be rotated in a clockwise direction (Fig. 10) by means of the compression spring 37ª, such rotation being uniformly controlled by the dashpot piston 40. During the first portion of this rotation the control arm 32 rides over the circular portion 31ᵇ of the rocker 31, which portion is at this time concentric to the control shaft, and during this same rotative portion of the control shaft, the rotation of cam 49 thereon permits the springs 63ᵇ to withdraw the cutter from the work. During the remaining portion of the rotation of the control shaft, the end of arm 32 enters the socket 31ᶜ and rocks the rocker 31 in an anticlockwise direction which through the rod 30 and arm 29 disengages the clutch 10 and stops the spindle rotation. It will therefore be seen that the automatic operation of the machine first withdraws the cutter from engagement with the work and thereafter stops the rotation of the work spindle.

After rotating the shaft 53 to return the work spindle 4, cutter carriage 45 and trip gear 27 to initial position as has heretofore been fully described, and after removing the finished work piece and chucking a new piece, the quick-acting mechanism for moving the cutter carriage and lead screw from work-chucking interfering position being operated as heretofore described, if the work being done requires such operation, the manner of starting the operation of the machine is as follows: The handle 34 is raised and through the engagement of shoulders 34ª and 35ª (Fig. 14) the control shaft is rotated. The first portion of the rotative movement of the control shaft, through the engagement of arm 32 with socket 31ᶜ, rocks the rocker 31 in a clockwise direction (Fig. 10) and engages the clutch 10 thereby starting the rotation of the spindle and mechanism operated thereby. It should be noted that the spring 30ª forms a resilient connection between the clutch and its operating means to prevent any breakage of such parts should the clutch teeth not initially come into register. During the further rotation of the control shaft the arm 32 rides over the concentric portion 31ᵇ of the rocker and through the cam 59 and cutter slide 54 moves the cutter into full engagement with the work. As soon as dog 28 is moved past the nose 42ᶜ of arm 42, the shoulder 42ª of the arm drops into engagement with the arm 41 of the control shaft and locks the same in its operative position. It will therefore be seen that in starting the operation of the machine the movement of the common controlling means, namely, handle 34 and control shaft 33, first operates to start the rotation of the spindle and thereafter by the continued movement of such means the cutter is moved into full engagement or depth into the work. During each threading operation the work is rotated through approximately one and one-eighth revolutions whereby the portion of the thread where the cutter first enters the work is passed over again in the finishing of the thread, such operation forming a smooth, clean thread entirely around the work.

What we claim is:

1. In a milling machine, the combination of a rotary work spindle and driving means therefor, a rotary cutter, means for moving the cutter to full depth into the work and out of engagement with the work only while the work spindle is rotating, and manually operable means for operating the second mentioned means.

2. In a milling machine, the combination of a rotary work spindle and driving means therefor, a rotary cutter, a cutter carriage, and means comprising a handle on the carriage for moving the cutter to full depth into the work and out of engagement with the work only while the work spindle is rotating.

3. In a thread milling machine, the combination of a rotary work spindle and driving means therefor, a clutch between the driving means and spindle for controlling the rotation of the spindle, a cutter slide, a rotary cutter mounted thereon, means for moving the cutter slide laterally to move the cutter into the work, and an operative connection between the clutch and the said means whereby movement of the said means to move the cutter into the work automatically closes the clutch and starts the rotation of the spindle before the cutter has been brought to its full cutting depth into the work.

4. In a thread milling machine, the combination of a rotary work spindle and driving means therefor, a cutter slide, a rotary cutter mounted thereon, and mechanism comprising a shaft having means thereon for controlling the spindle rotating means and the cutter slide respectively whereby the spindle is always rotating when the cutter is at full cutting depth in the work.

5. In a thread milling machine, the combination of a rotary work spindle and driving means therefor, a rotary cutter, a cutter carriage, mechanism comprising a shaft having means thereon for controlling the spindle rotating means and the cutter respectively whereby the spindle is always rotating when the cutter is at full cutting depth in the work, and a handle on the carriage for operating the shaft.

6. In a thread milling machine, the combination of a rotary work spindle and driving means therefor, a cutter slide, a rotary cutter mounted thereon, and mechanism comprising a shaft having means thereon for controlling the rotation of the spindle and the transverse movement of the cutter slide respectively, the said mechanism being adapted to engage the spindle driving means before moving the cutter to full cutting depth into the work and being adapted to operate the slide to move the cutter from engagement with the work before stopping the rotation of the spindle.

7. In a thread milling machine, the combination of a rotary work spindle and driving means therefor, a rotary cutter, mechanism comprising a shaft having means thereon for controlling the rotation of the spindle and the transverse movement of the cutter respectively, a rocker for controlling the spindle driving means, and an arm on the shaft engaging the rocker and adapted to operate the same to engage or disengage the spindle driving means only when the cutter is in a position other than its full cutting depth in the work.

8. In a thread milling machine, the combination of a rotary work spindle and driving means therefor, a rotary cutter, a clutch for controlling the spindle driving means, a controlling shaft, and clutch operating means comprising an element having a face thereon concentric with the controlling shaft when the clutch is fully engaged and an operating arm on the shaft adapted to ride over the said face when moving the cutter into and out of work-engaging position, whereby the cutter is movable to fully engage and disengage the work only when the work spindle is rotating.

9. In a milling machine, the combination of a rotary work spindle and driving means therefor, a cutter slide, a rotary cutter mounted thereon, and means for first starting the rotation of the spindle and thereafter by the continued movement of the said means positively moving the slide to move the cutter to full depth into the work.

10. In a milling machine, the combination of a rotary work spindle and driving means therefor, a rotary cutter, means for first starting the rotation of the spindle and thereafter by the continued movement of the said means positively moving the cutter to full depth into the work, and manual means for operating the second mentioned means.

11. In a thread milling machine, the combination of a rotary work spindle and driving means therefor, a rotary cutter, a clutch for controlling the rotation of the spindle, and means comprising a hand lever for first engaging the clutch to drive the spindle and thereafter moving the cutter to full depth into the work by the continued movement of the lever.

12. In a thread milling machine, the combination of a rotary work spindle and driving means therefor, a rotary cutter, a cutter carriage, a clutch for controlling the rotation of the spindle, and means comprising a hand lever on the carriage for first engaging the clutch to drive the spindle and thereafter moving the cutter to full depth into the work by the continued movement of the lever.

13. In a thread milling machine, the combination of a rotary work spindle and driving means therefor, a rotary cutter, and controlling mechanism comprising a shaft having a handle loosely mounted thereon and adapted to engage a shoulder on the shaft to operate the same, such shaft being adapted by its movement to first start the rotation of the spindle and thereafter by its continued movement to move the cutter to full depth into the work, the said handle being adapted to hang loosely from the shaft with the said shoulders disengaged during the cutting operation.

14. In a milling machine, the combination of a rotary work spindle and driving means therefor, a cutter slide, a rotary cutter mounted thereon, and means for first operating the slide to withdraw the cutter from the work and thereafter stopping the rotation of the work spindle.

15. In a thread milling machine, the combination of a rotary work spindle normally rotative in one direction only and driving means therefor, a clutch between the driving means and spindle for controlling the rotation of the spindle, a rotary cutter, hand operated means for moving the cutter laterally into engagement with the work, means for moving the cutter out of engagement with the work, and an operative connection between the clutch and the last said means whereby movement of such means to move the cutter out of engagement with the work automatically opens the clutch and stops the rotation of the spindle after the cutter has been withdrawn from engagement with the work.

16. In a milling machine, the combination of a rotary work spindle and driving means therefor, a rotary cutter, and controlling means comprising an oscillatory shaft adapted by its rotative movement in one direction to first effect withdrawal of the cutter from the work and thereafter by its continued rotative movement in the same direction to stop the rotation of the work spindle.

17. In a thread milling machine, the combination of a rotary work spindle and driving means therefor, a cutter slide, a rotary cutter mounted thereon, and means controlled by the rotation of the spindle for first operating the slide to withdraw the cutter from the work and thereafter stopping the rotation of the spindle.

18. In a thread milling machine, the combination of a rotary work spindle and driving means therefor, a rotary cutter, and means controlled through the rotation of the spindle and adapted when the spindle is rotated through a definite predetermined angle to withdraw the cutter from the work and thereafter stop the rotation of the spindle.

19. In a thread milling machine, the combination of a rotary work spindle and driving means therefor, a cutter slide, a rotary cutter mounted thereon, controlling means comprising a shaft, and means controlled through the rotation of the spindle for operating the shaft and adapted when the spindle is rotated through a definite predetermined angle greater than 360° to operate the slide to withdraw the cutter from the work and thereafter stop the rotation of the spindle.

20. In a thread milling machine, the combination of a rotary work spindle and driving means therefor, a rotary cutter, controlling means comprising a shaft, and spring means controlled through the rotation of the spindle for operating the shaft and adapted when the spindle is rotated through a definite predetermined angle greater than 360° to withdraw the cutter from the work and thereafter stop the rotation of the spindle.

21. In a thread milling machine, the combination of a rotary work spindle and driving means therefor, a rotary cutter, a cutter carriage, means for sliding the carriage, the work spindle being operatively connected to such means to feed the carriage, means for moving the cutter into engagement with the work and for starting the rotation of the spindle, and means cooperating with the cutter and driving means at the end of a predetermined rotation of the spindle for first withdrawing the cutter from the work and thereafter stopping the rotation of the spindle.

22. In a thread milling machine, the combination of a rotary work spindle and driving means therefor, a rotary cutter, means for starting the rotation of the spindle and for moving the cutter into engagement with the work, a latch for holding the members in such working position, a dog for disengaging the latch at the end of a predetermined rotation of the spindle, and means for operating the second named means when the latch is disengaged to first withdraw the cutter from the work and thereafter stop the rotation of the spindle.

23. In a thread milling machine, the combination of a rotary work spindle and driving means therefor, a rotary cutter, a cutter carriage, a screw for feeding the carriage, the work spindle being operatively connected to such screw, means for moving the cutter into engagement with the work and for starting the rotation of the spindle, a latch for holding the members in such working position, a dog for disengaging the latch at the end of a predetermined rotation of the spindle, and means for operating the second named means when the latch is disengaged to first withdraw the cutter from the work and thereafter stop the rotation of the spindle.

24. In a thread milling machine, the combination of a rotary work spindle and driving means therefor, a rotary cutter, a controlling shaft adapted by its rotation to start the rotation of the spindle and the continued rotation of the shaft being adapted thereafter to move the cutter to full depth into the work, a latch for holding the members in such working position, a dog for disengaging the latch at the end of a predetermined rotation of the spindle, and a spring adapted when the latch is disengaged to turn the shaft in the opposite direction to first withdraw the cutter from the work and then stop the rotation of the spindle.

25. In a milling machine, the combination of a rotary work spindle and driving means therefor, a member secured for rotation with the spindle, a second member loosely mounted on the spindle, a trip dog on the second member, mechanism for controlling the operation of the spindle, and means connecting the said two members in such a manner that during one revolution of the second member the spindle rotates through more than one revolution, the trip dog being adapted to operate the spindle controlling mechanism to stop the spindle rotation at the end of one revolution of the second member.

26. In a milling machine, the combination of a rotary work spindle and driving means therefor, a gear secured to the spindle, a second gear loosely mounted on the spindle, a trip dog on the second gear, mechanism for controlling the operation of the spindle, and gearing connecting the said two gears in such manner that during one revolution of the second gear the spindle rotates through more than one revolution, the trip dog being adapted to release the spindle controlling mechanism at the end of one revolution of the second gear whereupon the said mechanism functions to stop the spindle rotation.

27. In a milling machine, the combination of a rotary work spindle and driving means therefor, a gear secured to the spindle, a second gear loosely mounted on the spindle, a trip dog on the second gear, and mechanism for controlling the operation of the spindle comprising a shaft parallel with the spindle and two gears on the shaft, one of such two gears having the same number of teeth as and meshing with the first named gear on the spindle and the other of such two gears having a smaller number of teeth than and meshing with the second gear on the spindle, the arrangement being such that the spindle is rotated through more than one revolution during one revolution of the second gear, the trip dog being adapted to operate the spindle controlling mechanism at each revolution of the second gear whereby the spindle rotation is stopped at the end of a predetermined rotative movement thereof.

28. In a milling machine, the combination of a rotary work spindle and driving means therefor, a rotary cutter, a member adapted to be driven synchronously with the spindle but at a lower angular speed, a trip dog on the member, and means adapted to be operated by the dog at the end of each revolution of the member to first move the cutter from engagement with the work and thereafter to stop the rotation of the spindle.

29. In a milling machine, the combination of a rotary work spindle and driving means therefor, a rotary cutter, a gear adapted to be driven synchronously with the spindle but at a lower angular speed, a trip dog on the gear, means for starting the rotation of the work spindle and for moving the cutter into engagement with the work, and cooperating means adapted to be released by the dog at the end of each revolution of the gear and to first move the cutter from engagement with the work and thereafter to stop the rotation of the spindle.

30. In a milling machine, the combination of a rotary work spindle and driving means therefor, a rotary cutter, a gear adapted to be driven synchronously with the spindle but at a lower angular speed, a trip dog on the gear, a spring, means operative against the action of the spring to start the rotation of the work spindle and to move the cutter into engagement with the work, and a latch for holding such elements in their working position, the dog at each revolution of the gear being adapted to disengage the latch whereupon the spring operates the second mentioned means to first disengage the cutter from the work and thereafter to stop the rotation of the spindle.

31. In a milling machine, the combination of a rotary work spindle and driving means therefor, a rotary cutter, a clutch for controlling the operation of the driving means, a gear adapted to be driven synchronously with the spindle but at a lower angular speed, a trip dog on the gear, a controlling shaft having means thereon for engaging the clutch and moving the cutter into engagement with the work and for disengaging the clutch and moving the cutter from engagement with the work respectively, a spring connected with the shaft and normally operative to disengage the said elements, means for rotating the shaft to engage the said elements, and a latch for holding such elements in their working position, the dog at each revolution of the gear being adapted to disengage the latch whereupon the spring operates the shaft to first disengage the cutter from the work and thereafter to disengage the clutch.

32. In a milling machine, the combination of a rotary work spindle, spindle driving means, a clutch mechanism between the driving means and the spindle, and a single means adapted to disengage the clutch mechanism and to rotate the spindle independently of its driving means.

33. In a milling machine, the combination of a rotary work spindle, spindle driving means, a clutch mechanism between the driving means and the spindle, and a single means adapted to disengage the clutch mechanism and to rotate the spindle independently of its driving means in either direction.

34. In a milling machine, the combination of a rotary work spindle, spindle driving means, a roller clutch mechanism between the driving means and spindle, and a single means adapted to disengage the clutch mechanism by disengaging the rollers thereof from driving position and to rotate the spindle independently of its driving means.

35. In a milling machine, the combination of a rotary work spindle, a clutch mechanism, a driving means surrounding the spindle and forming one element of the clutch mechanism, the other element of the clutch mechanism being secured to the spindle, and a single means adapted to disengage the clutch mechanism and to rotate the spindle independently of its driving means.

36. In a milling machine, the combination of a rotary work spindle, a clutch mechanism, a driving means surrounding the spindle and forming one element of the clutch mechanism, the other element of the clutch mechanism being secured to the spindle, and a single means adapted to disengage the clutch mechanism and to rotate the spindle independently of its driving means in either direction.

37. In a milling machine, the combination of a rotary work spindle, a roller clutch mechanism, a driving means surrounding the spindle and forming the driving element of the clutch mechanism, the driven element of the clutch mechanism being secured to the spindle, and means adapted to disengage the clutch mechanism by disengaging the rollers thereof from driving position and to rotate the spindle independently of its driving means.

38. In a milling machine, the combination of a rotary work spindle, a roller clutch mechanism comprising a pair of rollers, a driving means surrounding the spindle and forming the driving element of the clutch mechanism, the driven element of the clutch mechanism being secured to the spindle, and means comprising a pin between the said rollers adapted to disengage either of the said rollers from driving engagement and to rotate the spindle in either direction independently of its driving means.

39. In a thread milling machine, the combination of a rotary work spindle, spindle driving means, a cutter carriage, means for moving the carriage, the work spindle being operatively connected to such means to feed the carriage in definite timed relation, a clutch mechanism between the driving means and the spindle, and a single means adapted to disengage the clutch mechanism and to rotate the spindle and move the carriage independently of the said driving means.

40. In a thread milling machine, the combination of a rotary work spindle, spindle driving means, a cutter carriage, a screw for feeding the carriage, the work spindle being operatively connected to the screw to feed the carriage in definite timed relation, a clutch mechanism between the driving means and the spindle, and a single means adapted to disengage the clutch mechanism and to rotate the spindle and screw independently of the said driving means.

41. In a thread milling machine, the combination of a rotary work spindle, a cutter carriage, means for moving the carriage, the work spindle being operatively connected to such means to feed the carriage in definite timed relation, a clutch mechanism, a driving means surrounding the spindle and forming the driving element of the clutch mechanism, the driven element of the clutch mechanism being secured to the spindle, and means adapted to disengage the clutch mechanism, rotate the spindle and move the carriage independently of the said driving means.

42. In a thread milling machine, the combination of a rotary work spindle, a cutter carriage, a screw for feeding the carriage, the work spindle being operatively connected to such screw to feed the carriage in definite timed relation, a clutch mechanism, a driving means surrounding the spindle and forming a driving element of the clutch mechanism, the driven element of the clutch mechanism being secured to the spindle, and means adapted to disengage the clutch mechanism and to rotate the spindle and screw independently of the said driving means.

43. In a thread milling machine, the combination of a rotary work spindle, a cutter carriage, a screw for feeding the carriage in a direction parallel with the spindle axis, change-speed gearing operatively connecting the spindle with the feed screw, a clutch mechanism, a driving means surrounding the spindle and forming the driving element of the clutch mechanism, the driven element of the clutch mechanism being secured to the spindle, and means adapted to disengage the clutch mechanism and to rotate the spindle and screw independently of the said driving means.

44. In a thread milling machine, the combination of a rotary work spindle, a cutter carriage, a screw for feeding the carriage, the work spindle being operatively connected to such screw, a clutch mechanism, a driving means surrounding the spindle and forming the driving element of the clutch mechanism, the driven element of the clutch mechanism being secured to the spindle, means adapted to disengage the clutch mechanism and to rotate the spindle and screw independently of the said driving means, and hand operated means for operating the last mentioned means.

45. In a thread milling machine, the combination of a rotary work spindle, spindle driving means, a cutter carriage, a screw for feeding the carriage, the work spindle being operatively connected to the screw to feed the carriage in definite timed relation, a roller clutch mechanism between the driving means and the spindle, and means adapted to disengage the clutch mechanism by disengaging the rollers thereof from driving position and to rotate the spindle and screw independently of the driving means.

46. In a thread milling machine, the combination of a rotary work spindle, spindle driving means, a cutter carriage, a screw for feeding the carriage, the work spindle being operatively connected to the screw to feed the carriage in definite timed relation, a roller clutch mechanism, a driving means surrounding the spindle and forming the driving element of the clutch mechanism, the driven element of the clutch mechanism being secured to the spindle, and means adapted to disengage the clutch mechanism by disengaging the rollers thereof from driving position and to rotate the spindle and screw independently of the driving means.

47. In a milling machine, the combination of a base, a carriage slidably mounted thereon, a lead screw for feeding the carriage, lead screw rotating means having the lead screw splined for longitudinal movement therein, and means for longitudinally bodily moving the lead screw to move the carriage into and out of operative position and for securing the screw in its operative position.

48. In a milling machine, the combination of a base, a carriage slidably mounted thereon, a lead screw for feeding the carriage, lead screw rotating means having the lead screw splined for longitudinal movement therein, and a single means for positively moving the lead screw longitudinally and bodily to move the carriage into and out of operative position and for positively securing the screw in its operative position.

49. In a milling machine, the combination of a base, a carriage slidably mounted thereon, a lead screw for feeding the carriage, a driving element having the screw splined thereto, a member having the screw journaled thereto against longitudinal movement therewith, and means for bodily longitudinally moving the member and screw to move the carriage into and out of operative position and to secure the screw in its operative position.

50. In a milling machine, the combination of a base, a carriage slidably mounted thereon, a lead screw for feeding the carriage, a driving element having the screw splined thereto, a member having the screw journaled thereto against longitudinal movement therewith, and a single means for positively moving the member and screw longitudinally and bodily to move the carriage into and out of operative position and to positively secure the screw in its operative position.

51. In a milling machine, the combination of a base, a carriage slidably mounted thereon, a lead screw for feeding the carriage, a driving element having the screw splined thereto, a sleeve having the screw journaled therein against longitudinal movement therewith, a support on the base for the sleeve, and means for moving the sleeve longitudinally in the support for longitudinally bodily moving the screw to move the carriage into and out of operative position and for securing the screw and carriage in the operative position.

52. In a milling machine, the combination of a base, a carriage slidably mounted thereon, a lead screw for feeding the carriage, a driving element having the screw splined thereto, a sleeve having the screw journaled therein against longitudinal movement therewith, a support on the base for the sleeve, a stop means on the sleeve adapted to engage the support, and means for moving the sleeve longitudinally in the support for longitudinally bodily moving the screw to move the carriage into and out of operative position and for securing the screw and carriage in the operative position with the said stop means in tight engagement with the support.

53. In a milling machine, the combination of a base, a carriage slidably mounted thereon, a lead screw for feeding the carriage, a driving element having the screw splined thereto, a sleeve having the screw journaled therein against longitudinal movement therewith, a support on the base for the sleeve, adjustable stop means on the sleeve adapted to engage the support, and means for moving the sleeve longitudinally in the support for longitudinally bodily moving the screw to move the carriage into and out of operative position and for securing the screw and carriage in the operative position with the said stop means in tight engagement with the support.

54. In a milling machine, the combination of a base, a rotary work spindle mounted therein, a cutter carriage slidably mounted thereon, a lead screw for feeding the carriage longitudinally of the work spindle, a driving element having the screw splined thereto, a member having the screw journaled thereto against longitudinal movement therewith, and means comprising a link connected to the member and adapted to longitudinally bodily move the member and lead screw to move the carriage into and out of operative position and for securing such elements in their operative position.

55. In a milling machine, the combination of a base, a rotary work spindle mounted therein, a cutter carriage slidably mounted thereon, a lead screw for feeding the carriage longitudinally of the work spindle, a driving element having the screw splined thereto, a member having the screw journaled thereto against longitudinal movement therewith, and means comprising a link connected to the member at one end and having mechanism at its other end for moving the link and the elements connected thereto longitudinally of the work spindle to a predetermined work-operating position and for securing the link in such position.

56. In a milling machine, the combination of a base, a rotary work spindle mounted therein, a cutter carriage slidably mounted thereon, a lead screw for feeding the carriage longitudinally of the work spindle, a driving element having the screw splined thereto, a member having the screw journaled thereto against longitudinal movement therewith, means comprising a link connected to the member at one end, a rotary element having a crank pin thereon engaging the other end of the link, means for rotating the element to carry the pin around the center of such rotation and move the link and elements connected thereto longitudinally of the work spindle into and out of work-operating position, and means for locking the link and its elements in work-operating position.

57. In a milling machine, the combination of a base, a rotary work spindle mounted therein, a cutter carriage slidably mounted thereon, a lead screw for feeding the carraige longitudinally of the work spindle, a driving element having the screw splined thereto, a member having the screw journaled thereto against longitudinal movement therewith, means comprising a link connected to the member at one end, a rotary element having a crank pin thereon engaging the other end of the link, means for rotating the element to carry the pin around the center of such rotation and move the link and elements connected thereto longitudinally of the work spindle into and out of work-operating position, and means for locking the link and its elements in work-operating position with the crank pin and the center of the rotary element in alignment with the line of stress exerted through the link in holding the elements in work-operating position.

58. In a milling machine, the combination of a base, a rotary work spindle mounted therein, a cutter carriage slidably mounted thereon, means for feeding the carriage longitudinally of the work spindle, means operatively connected to the carriage, a rotary element having a crank pin thereon engaging the second mentioned means, means for rotating the element to carry the pin around the center of such rotation and move the first named means and carriage longitudinally of the work spindle into and out of work-operating position, and means for locking the first mentioned means and carriage in work-operating position.

59. In a milling machine, the combination of a base, a rotary work spindle mounted therein, a cutter carriage slidably mounted thereon, means for feeding the carriage longitudinally of the work spindle, a link operatively connected to the carriage at one end, a rotary element having a crank pin thereon engaging the other end of the link, means for rotating the element to carry the pin around the center of such rotation and move the link and carriage longitudinally of the work spindle into and out of work-operating position, and means for locking the link and carriage in work-operating position.

60. In a milling machine, the combination of a base, a rotary work spindle mounted therein, a cutter carriage slidably mounted thereon, means for feeding the carriage longitudinally of the work spindle, a link operatively connected to the carriage at one end, a gear having a crank pin thereon engaging the other end of the link, a second gear one-half the size of and meshing with the first named gear, one complete rotation of the smaller gear in reverse directions being adapted to carry the pin around the center of the rotation of the first named gear and move the link and carriage longitudinally of the work spindle into and out of work-operating position, and a latch for locking the second named gear whereby the link and carriage are locked in work-operating position with the crank pin and the center of the first named gear in alignment with the line of stress exerted through the link in holding the carriage in work-operating position.

61. In a milling machine having a base and a rotary work spindle mounted therein, the combination of a cutter carriage movable on the base longitudinally of the spindle, a cutter slide movable on the carriage transversely of the spindle, a cutting tool, a taper bar carried by the slide, means connecting the tool to the bar and adapted to positively control the transverse movement of the tool during the cutting operation, and means for moving the slide transversely of the spindle.

62. In a milling machine having a base and a rotary work spindle mounted therein, the combination of a cutter carriage movable on the base longitudinally of the spindle, a cutter slide movable on the carriage transversely of the spindle, a cutting tool, a taper bar carried by the slide, a screw connecting the tool to the bar and adapted to positively control the transverse movement of the tool during the cutting operation by moving the screw bodily, and means for moving the slide transversely of the spindle.

63. In a milling machine having a base and a rotary work spindle mounted therein, the combination of a cutter carriage movable on the base longitudinally of the spindle, a cutter slide movable on the carriage transversely of the spindle, a cutting tool, a screw for adjusting the tool transversely of the spindle relative to the slide, a taper bar carried by the slide, means journaled to the screw against longitudinal movement therewith and connected to the bar whereby to control the transverse movement of the tool during the cutting operation, and means for moving the slide transversely of the spindle.

64. In a milling machine having a base and a rotary work spindle mounted therein, the combination of a cutter carriage movable on the base longitudinally of the spindle, a cutter slide movable on the carriage transversely of the spindle, a tool-supporting slide mounted on the cutter slide, a screw mounted in the cutter slide and threadedly engaging the tool-supporting slide, a taper bar carried by the cutter slide, a sleeve journaled to the screw against longitudinal movement therewith and connected to the bar, the rotation of the screw being adapted to adjust the tool toward and from the spindle axis and the movement of the sleeve and slide along the bar being adapted to control the transverse movement of the tool slide during the cutting operation, and means for moving the cutter slide transversely of the spindle to engage the tool with the work.

65. In a milling machine having a base and a rotary work spindle mounted therein, the combination of a cutter carriage movable on the base longitudinally of the spindle, a cutter slide movable on the carriage transversely of the spindle, a cutting tool, a screw for moving the tool transversely of the spindle relative to the slide, a taper bar carried by the slide, means on the base for engaging the ends of the bar, means journaled to the screw against longitudinal movement therewith and connected to the bar whereby to control the transverse movement of the tool during the cutting operation, and means for moving the slide transversely of the spindle.

66. In a milling machine having a base and a rotary work spindle mounted therein, the combination of a cutter carriage movable on the base longitudinally of the spindle, a cutter slide movable on the carriage transversely of the spindle, a cutting tool, a screw for moving the tool transversely of the spindle relative to the slide, a taper bar carried by the slide, means journaled to the screw against longitudinal movement therewith and connected to the bar whereby to control the transverse movement of the tool during the cutting operation, means for moving the slide transversely of the spindle, and means whereby the first named means may be secured to the slide.

67. In a milling machine having a base, a rotary work spindle mounted therein and driving means for the spindle, the combination of a cutter carriage movable on the base longitudinally of the spindle, a cutter slide movable on the carriage transversely of the spindle, a cutting tool, a screw for moving the tool transversely of the spindle relative to the slide, a taper bar carried by the slide, means journaled to the screw against longitudinal movement therewith and connected to the bar whereby to control the transverse movement of the tool during the cutting operation, and means common to the spindle driving means and the cutter slide for starting the rotation of the spindle and moving the slide transversely of the spindle to engage the cutter with the work.

68. In a milling machine having a base, a rotary work spindle mounted therein and driving means for the spindle, the combination of a cutter carriage movable on the base longitudinally of the spindle, a cutter slide movable on the carriage transversely of the spindle, a cutting tool, a screw for moving the tool transversely of the spindle relative to the slide, a taper bar carried by the slide, means journaled to the screw against longitudinal movement therewith and connected to the bar whereby to control the transverse movement of the tool during the cutting operation, and means common to the spindle driving means and the cutter slide for first starting the rotation of the spindle and thereafter engaging the cutter with the work.

69. A screw thread hobbing machine comprising in combination, a base, a head thereon provided with a rotatable spindle adapted to carry work, a carriage movable longitudinally relative to said work spindle, a carrying member mounted on said carriage and movable transversely of said carriage, a hob rotatably mounted in said carrying member, means for quickly moving said carriage through a predetermined distance to bring said hob into cutting relation with work mounted in said work spindle and for quickly returning said carriage to its initial inoperative position, means for moving said carrying member and said hob transversely of said carriage through a predetermined distance to move said hob to a predetermined depth into said work and for returning it to its initial position, means for feeding said carriage longitudinally in timed relation to said spindle rotation to cause said hob to cut a screw thread, and means dependent on the rotation of said work spindle for stopping the spindle rotation and the said feeding movement of the hob after one and a fraction rotations of the spindle.

70. A screw thread hobbing machine comprising in combination, a base, a head thereon provided with a rotatable spindle adapted to carry work, a carriage movable longitudinally relative to said work spindle, a carrying member mounted on said carriage and movable transversely of said carriage, a hob rotatably mounted in said carrying member, means for quickly moving said carriage through a predetermined distance to bring said hob into cutting relation with work mounted in said work spindle and for quickly returning said carriage to its initial inoperative position, means for simultaneously starting the spindle rotation and moving said carrying member and said hob transversely of said carriage through a predetermined distance to move said hob to a predetermined depth into said work and for returning it to its initial position, means for feeding said carriage longitudinally in timed relation to said spindle rotation to cause said hob to cut a screw thread, and means dependent on the rotation of said work spindle for stopping the spindle rotation and the said feeding movement of the hob after one and a fraction rotations of the spindle.

71. A screw thread hobbing machine comprising in combination, a base, a head thereon provided with a rotatable spindle adapted to carry work, a carriage movable longitudinally relative to said work spindle, a carrying member mounted on said carriage and movable transversely of said carriage, a hob rotatably mounted in said carrying member, means for quickly moving said carriage through a predetermined distance to bring said hob into cutting relation with work mounted in said work spindle and for quickly returning said carriage to its initial inoperative position, means for moving said carrying member and said hob transversely of said carriage through a predetermined distance to move said hob to a predetermined depth into said work and for returning it to its initial position, means for starting the spindle rotation before the hob has been fed to full depth into the work, means for feeding said carriage longitudinally in timed relation to said spindle rotation to cause said hob to cut a screw thread, and means dependent on the rotation of said work spindle for stopping the spindle rotation and the said feeding movement of the hob after one and a fraction rotations of the spindle.

72. A screw thread hobbing machine comprising in combination, a base, a head thereon provided with a rotatable spindle adapted to carry either external or internal work, means whereby the spindle may be rotated in one direction or the other for operating on either external or internal work, a carriage movable longitudinally relative to said work spindle, a carrying member mounted on said carriage and movable transversely of said carriage, a hob rotatably mounted in said carrying member, means for quickly moving said carriage through a predetermined distance to bring said hob into cutting relation with either external or internal work mounted in said work spindle and for quickly returning said carriage to its initial inoperative position, means for moving said carriage member and said hob transversely of said carriage through a predetermined distance to move said hob to a predetermined depth into said work and for returning it to its initial position, means for feeding said carriage longitudinally in timed relation to said spindle rotation to cause said hob to cut a screw thread, and means dependent on the rotation of said work spindle for stopping said feeding movement of said hob after one and a fraction rotations of the spindle.

73. A screw thread hobbing machine comprising in combination, a base, a head thereon provided with a rotatable spindle adapted to carry work, a carriage movable longitudinally relative to said work spindle, a rotatable hob and a carrying member therefor movable transversely on said carriage, and mechanism whereby said work spindle, carriage and hob may be operated in approximately the following sequence: said carriage quickly moved longitudinally through a predetermined distance to bring said hob into cutting relation with work mounted on said work spindle, rotation of said work spindle started and said hob moved transversely of said carriage to bring said hob to predetermined depth into said work, said carriage fed longitudinally of said work spindle in timed relation to the spindle rotation to cause said hob to cut a screw thread, said hob returned transversely of the carriage to its initial position and rotation of said work spindle automatically stopped after a predetermined movement comprising one and a fraction rotations, and said carriage quickly returned longitudinally to its inoperative position.

74. A screw thread hobbing machine comprising in combination, a base, a head thereon provided with a rotatable spindle adapted to carry either external or internal work, means whereby the spindle may be rotated in one direction or the other for operating on either external or internal work, a carriage movable longitudinally relative to said work spindle, a rotatable hob and a carrying member therefor movable transversely on said carriage, and mechanism whereby said work spindle, carriage and hob may be operated in approximately the following sequence: said carriage quickly moved longitudinally through a predetermined distance to bring said hob into cutting relation with external or internal work mounted on said work spindle, rotation of the work spindle started and said hob moved transversely of said carriage through a predetermined distance to bring said hob into a predetermined depth in said work, said carriage fed longitudinally of said work spindle in timed relation to the spindle rotation to cause said hob to cut a screw thread, said hob automatically returned transversely of the carriage through its aforesaid predetermined distance to its initial position after said work spindle has completed a predetermined movement comprising one and a fraction rotations, rotation of the spindle stopped, and said carriage quickly returned longitudinally through the aforesaid predetermined distance to its inoperative position.

75. A screw thread hobbing machine comprising in combination, a base, a head thereon provided with a rotatable spindle adapted to carry work, a carriage movable longitudinally relative to the spindle, a carrying member mounted on said carriage and movable transversely thereof, a hob rotatably mounted on said carrying member, means for moving said carrying member and said hob transversely of said carriage through a predetermined distance to move the hob to a predetermined depth into said work at the beginning of a cut and for returning it to its initial position at the end of the cut, means operatively connected to the spindle for feeding the carriage longitudinally in timed relation to the spindle rotation to cause the hob to cut a screw thread, means for quickly moving the carriage through a predetermined distance prior to a cut to bring the hob into cutting relation with work mounted in said work spindle and for quickly returning said carriage to its initial inoperative position after the cut without disturbing the said operative connection to the spindle, and means dependent on the rotation of the spindle whereby the spindle rotation and the feeding movement of the hob are stopped at the end of the cut.

76. A screw thread hobbing machine comprising in combination, a base, a head thereon provided with a rotatable spindle adapted to carry either external or internal work, a carriage movable longitudinally relative to the spindle, a carrying member mounted on said carriage and movable transversely thereof, a hob spindle rotatably mounted in said carrying member, means whereby one of the spindles may be rotated in one direction or the other for operating on either external or internal work, means for moving said carrying member and said hob transversely of said carriage through a predetermined distance to move the hob to a predetermined depth into said work at the beginning of a cut and for returning it to its initial position at the end of the cut, means operatively connected to the spindle for feeding the carriage longitudinally in timed relation to the spindle rotation to cause the hob to cut a screw thread, means for quickly moving the carriage through a predetermined distance prior to a cut to bring the hob into cutting relation with either external or internal work mounted in said work spindle and for quickly returning said carriage to its initial inoperative position after the cut without disturbing the said operative connection to the spindle, and means dependent on the rotation of the spindle whereby the spindle rotation and the feeding movement of the hob are stopped after one and a fraction rotations of the work spindle.

In testimony whereof, we hereto affix our signatures.

REUBEN HILL.
EDWARD A. MOYER.